(12) United States Patent
Aonuma

(10) Patent No.: US 8,300,268 B2
(45) Date of Patent: Oct. 30, 2012

(54) IMAGE PROCESSING DEVICE

(75) Inventor: Koki Aonuma, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 881 days.

(21) Appl. No.: 12/408,601

(22) Filed: Mar. 20, 2009

(65) Prior Publication Data

US 2009/0237693 A1 Sep. 24, 2009

(30) Foreign Application Priority Data

Mar. 21, 2008 (JP) ................. 2008-073318

(51) Int. Cl.
*H04N 1/60* (2006.01)
(52) U.S. Cl. ........................................... 358/1.9
(58) Field of Classification Search ............ 358/1.9; 345/596, 597; 399/69, 88
See application file for complete search history.

(56) References Cited

U.S. PATENT DOCUMENTS

| 6,778,186 B2 * | 8/2004 | Mehigan ............... 345/596 |
| 7,583,910 B2 * | 9/2009 | Matsumoto et al. ........... 399/69 |
| 2009/0147287 A1 * | 6/2009 | Misawa .................. 358/1.9 |

FOREIGN PATENT DOCUMENTS

| JP | H09-090922 A | 4/1997 |
| JP | H09-090992 A | 4/1997 |
| JP | H10-111624 A | 4/1998 |
| JP | H10-275069 A | 10/1998 |
| JP | 2000-330908 A | 11/2000 |
| JP | 2000-333023 A | 11/2000 |
| JP | 2001-018459 A | 1/2001 |
| JP | 2002-373065 A | 12/2002 |
| JP | 2003-006631 A | 1/2003 |
| JP | 2004-184718 A | 7/2004 |
| JP | 2004-310441 A | 11/2004 |
| JP | 2005-079750 A | 3/2005 |
| JP | 2005-303584 A | 10/2005 |

OTHER PUBLICATIONS

Japanese Patent Office, Final Rejection for Patent Application No. JP2008-073318 A, mailed Aug. 17, 2010. (Counterpart to above-referenced U.S. patent application).
Japan Patent Office; Office Action in Japanese Patent Application No. 2008-073318A (counterpart to the above captioned US application) mailed May 18, 2010.

* cited by examiner

*Primary Examiner* — Charlotte M Baker
(74) *Attorney, Agent, or Firm* — Baker Botts L.L.P.

(57) ABSTRACT

An image processing device includes an acquiring unit, a calculating unit, a color data determining unit, an appending unit, and a converting unit. The acquiring unit acquires print data. The print data includes a plurality of sets of text data. Each set of text data has character data and color data. The calculating unit calculates, for each set of color data, an appearance ratio at which a subject set of color data appears in the print data. The color data determining unit determines the color data having a highest appearance ratio among a plurality of appearance ratios of a plurality of sets of color data as first color data, and determines the color data except for the first color data as second color data. The appending unit appends first attribute data to the character data included in the text data having the first color data, and appends second attribute data to the character data included in the text data having the second color data. The converting unit converts a plurality of sets of character data into binary data, based on one of the first attribute data and the second attribute data which is appended to the subject set of character data.

13 Claims, 14 Drawing Sheets

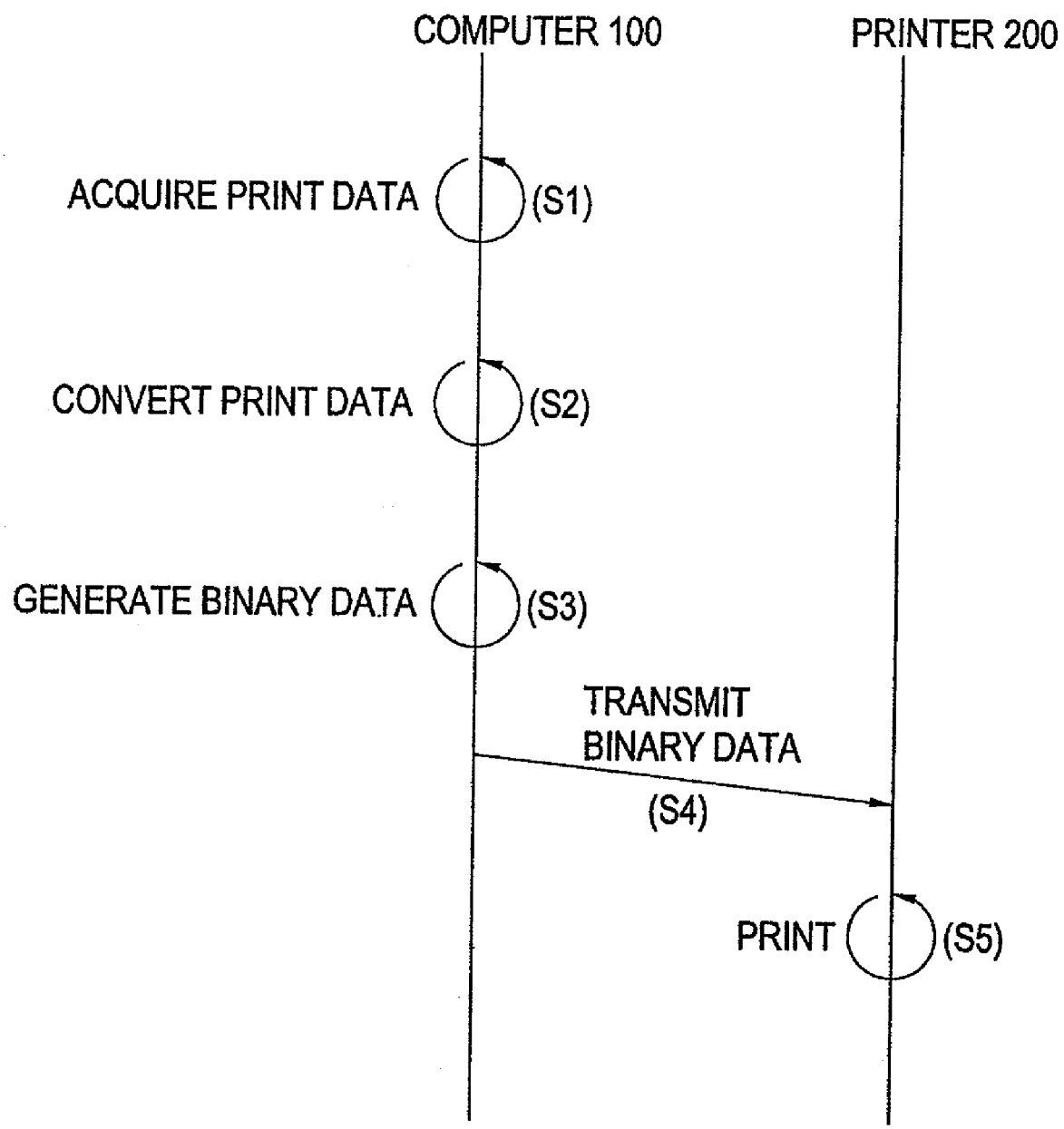

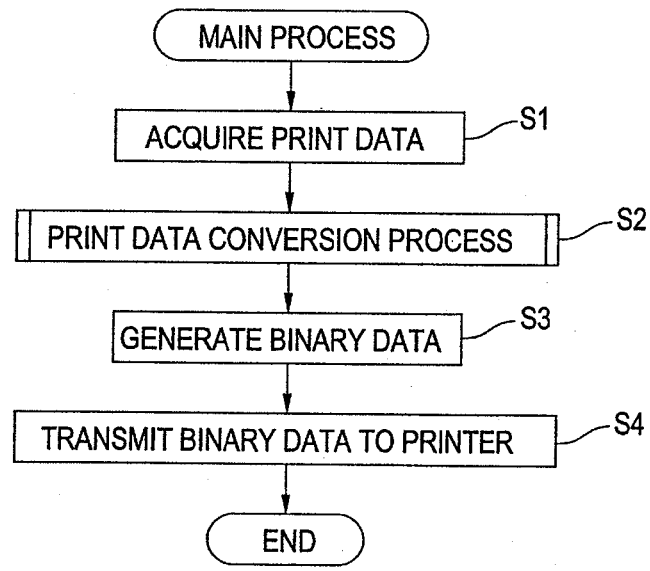
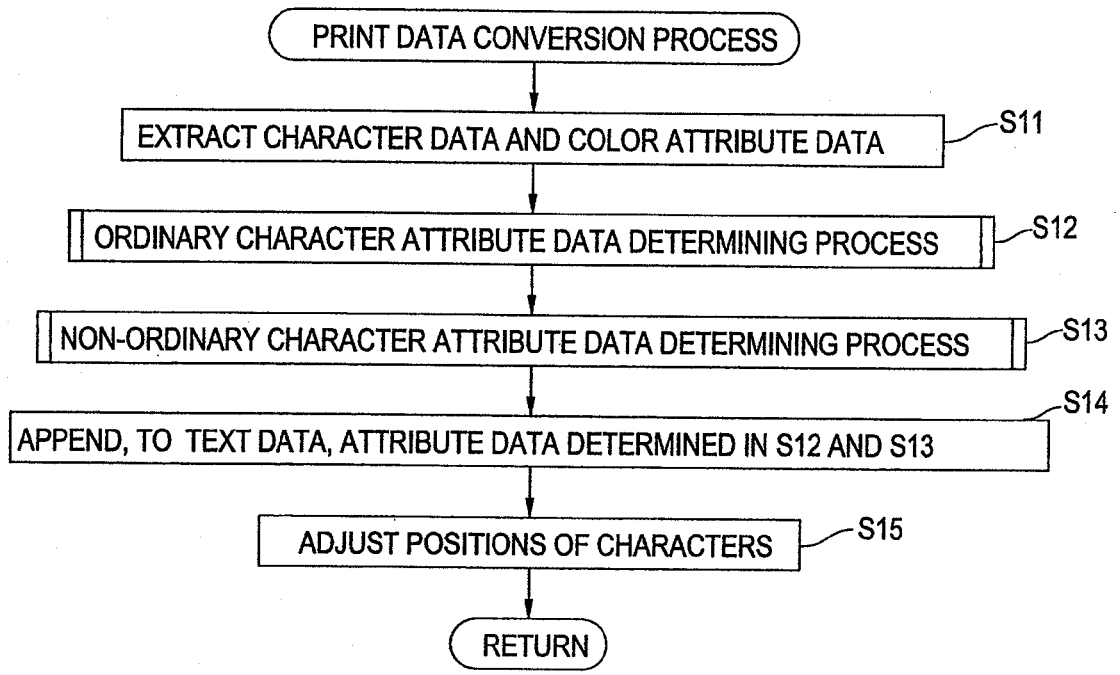

| COLOR ATTRIBUTE DATA | NUMBER |
|---|---|
| RED | 60 |
| BLACK | 280 |
| BLUE | 8 |

| CHARACTER ATTRIBUTE DATA | COLOR ATTRIBUTE DATA |
|---|---|
| ORDINARY CHARACTER ATTRIBUTE | BLACK |
| EMPHASIS CHARACTER ATTRIBUTE | RED |
| SUPPRESSION CHARACTER ATTRIBUTE | BLUE |

| CHARACTER ATTRIBUTE DATA | SETTINGS DATA |
|---|---|
| ORDINARY CHARACTER ATTRIBUTE | BLACK 100% |
| EMPHASIS CHARACTER ATTRIBUTE | BOLD & OVERLINE AND UNDERLINE |
| SUPPRESSION CHARACTER ATTRIBUTE | REDUCE FONT SIZE FOR 2pt |

IMAGE PROCESSING DEVICE

CROSS REFERENCE TO RELATED APPLICATION

This application claims priority from Japanese Patent Application No. 2008-073318 filed Mar. 21, 2008. The entire content of this priority application is incorporated herein by reference.

TECHNICAL FIELD

The present invention relates to an image processing device for converting color image data into monochrome image data.

BACKGROUND

Various techniques of printing color images in the form of monochrome prints (e.g., black-and-white prints) have been proposed hitherto. Japanese unexamined patent application publication No. 09-090922 discloses an image processing device that extracts color attribute of characters, then generates new attribute data from the color attribute extracted, and finally adds the attribute data to image data, thereby printing the image.

In the image processing device disclosed in Japanese unexamined patent application publication No. HEI-09-090922, the color data about the characters (text characters) constituting a text is uniquely determined with respect to the attribute data. Therefore, if a document has many characters to be printed in red, those parts printed in red will be underlined. This inevitably renders the document hard to read.

SUMMARY

In view of the foregoing, it is an object of the invention to provide an image processing device that is capable to appends appropriate attribute to the text characters included in a color image, thereby to provide monochrome prints having text characters that are easy to read (or easy to recognize visually).

In order to attain the above and other objects, the invention provides an image processing device including an acquiring unit, a calculating unit, a color data determining unit, an appending unit, and a converting unit. The acquiring unit acquires print data. The print data includes a plurality of sets of text data. Each set of text data has character data and color data. The calculating unit calculates, for each set of color data, an appearance ratio at which a subject set of color data appears in the print data. The color data determining unit determines the color data having a highest appearance ratio among a plurality of appearance ratios of a plurality of sets of color data as first color data, and determines the color data except for the first color data as second color data. The appending unit appends first attribute data to the character data included in the text data having the first color data, and appends second attribute data to the character data included in the text data having the second color data. The converting unit converts a plurality of sets of character data into binary data, based on one of the first attribute data and the second attribute data which is appended to the subject set of character data.

According to another aspect, the present invention provides an image processing method including: acquiring print data, the print data including a plurality of sets of text data, each set of text data having character data and color data; calculating, for each set of color data, an appearance ratio at which a subject set of color data appears in the print data; determining the color data having a highest appearance ratio among a plurality of appearance ratios of a plurality of sets of color data as first color data; determining the color data except for the first color data as second color data; appending first attribute data to the character data included in the text data having the first color data; appending second attribute data to the character data included in the text data having the second color data; and converting a plurality of sets of character data into binary data, based on one of the first attribute data and the second attribute data which is appended to the subject set of character data.

According to another aspect, the present invention provides a computer-readable recording medium that stores an image data processing program. The data processing program includes instructions for: acquiring print data, the print data including a plurality of sets of text data, each set of text data having character data and color data; calculating, for each set of color data, an appearance ratio at which a subject set of color data appears in the print data; determining the color data having a highest appearance ratio among a plurality of appearance ratios of a plurality of sets of color data as first color data; determining the color data except for the first color data as second color data; appending first attribute data to the character data included in the text data having the first color data; appending second attribute data to the character data included in the text data having the second color data; and converting a plurality of sets of character data into binary data, based on one of the first attribute data and the second attribute data which is appended to the subject set of character data.

According to another aspect, the present invention provides an image processing system including a printing device and an image processing device. The printing device prints characters based on binary data. An image processing device includes an acquiring unit, a calculating unit, a color data determining unit, an appending unit, a converting unit, and a transmitting unit. The acquiring unit acquires print data. The print data includes a plurality of sets of text data. Each set of text data has character data and color data. The calculating unit calculates, for each set of color data, an appearance ratio at which a subject set of color data appears in the print data. The color data determining unit determines the color data having a highest appearance ratio among a plurality of appearance ratios of a plurality of sets of color data as first color data, and determines the color data except for the first color data as second color data. The appending unit appends first attribute data to the character data included in the text data having the first color data, and appends second attribute data to the character data included in the text data having the second color data. The converting unit converts a plurality of sets of character data into binary data, based on one of the first attribute data and the second attribute data which is appended to the subject set of character data. The transmitting unit transmits the binary data to the printing device.

BRIEF DESCRIPTION OF THE DRAWINGS

The particular features and advantages of the invention as well as other objects will become apparent from the following description taken in connection with the accompanying drawings, in which:

FIG. 3 is an explanatory diagram showing how to flow data between the image processing device and the printing device according to the first embodiment;

FIG. 4 is a flowchart illustrating steps in a main process performed by the image processing device according to the first embodiment;

FIG. 5 is a flowchart illustrating steps in a print data conversion process in the main process according to the first embodiment;

DETAILED DESCRIPTION

An image processing system 1 according to a first embodiment of the invention will be described while referring to the FIGS. 1 through 10. In the image processing system 1, a computer 100 connects to a printer 200 via a relay apparatus 300.

The computer 100 and the printer 200 receive and transmit various data from and to each other. In response to the instructions coming from the computer 100, the printer 200 can perform monochrome printing (e.g., black-and-white printing). Each of the computer 100 and the printer 200 has ID data (e.g., IP address). The computer 100 can execute various programs, which will be described later.

Figure 1:
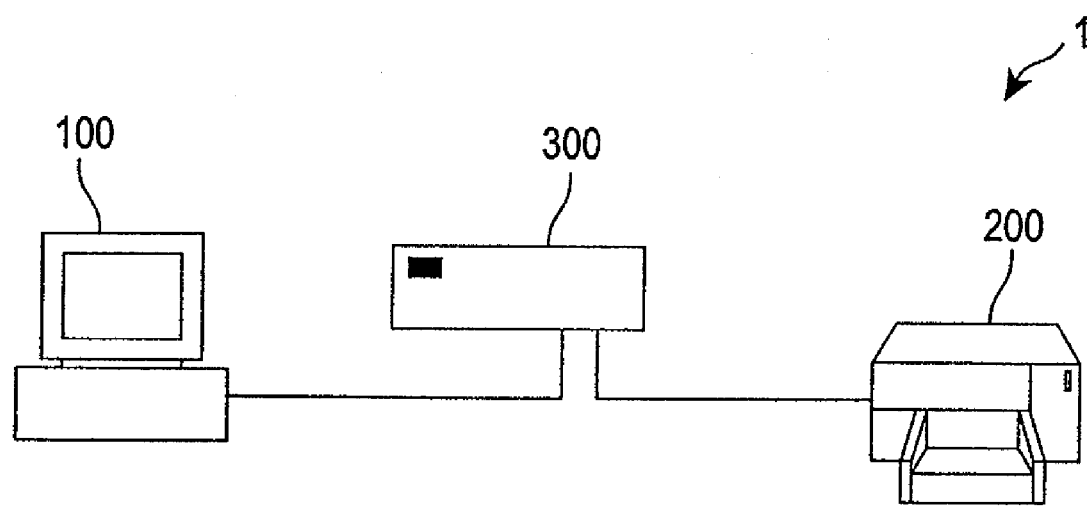
FIG. 1 is a conceptual diagram showing an image processing system according to a first embodiment of present invention, the printing system including an image processing device and a printing device.
Figure 2:
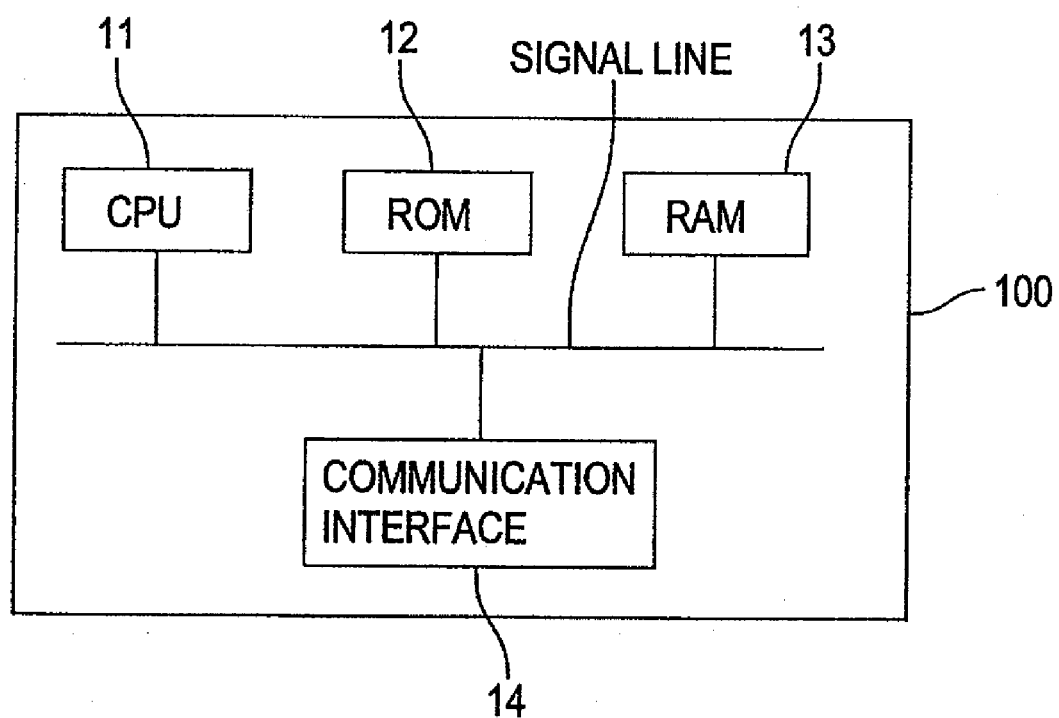
FIG. 2 is a block diagram showing an electrical structure of the image processing device.

As shown in FIG. 2, the computer 100 includes a CPU 11, a ROM 12, a RAM 13, and a communication interface 14. The ROM 12 is a nonvolatile memory that stores various programs including necessary for performing processes described later. The RAM 13 is a volatile memory storing the programs and data. The CPU 11 performs various processes by using the data stored in the ROM 12 and RAM 13. The CPU 11 executes various programs stored in the ROM 12 as drivers. When the CPU 11 executes these programs, the CPU 11 reads and writes various data stored in the RAM 13. The computer 100 transmits binary data to the printer 200 through the communication interface 14. The transmitted binary data is used to achieve monochrome printing. The CPU 11, ROM 12, RAM 13, and communication interface 14 are connected to each other via signal lines. The CPU 11 also controls the performances of the various component connected to the CPU 11 and controls the signals supplied to these component.

FIG. 3 shows how to transmit and receive data between the computer 100 and the printer 200. On receiving a print request from a specific application, the computer 100 acquires the print data associated with the print request (S1). Then, the computer 100 converts the print data to data having a prescribed settings data (attribute data) (S2). The process of converting the print data will be described later in detail.

The computer 100 generates binary data based on the converted print data (S3), by utilizing the technique known in the art. Then, the computer 100 transmits the binary data to the printer 200 (S4), and the printer 200 performs printing operation based on the binary data received from the computer 100 (S5).

Next, a basic process performed by the CPU 11 will be explained with reference to FIG. 4. The CPU 11 executes a program stored in the ROM 12 to perform the basic process. The computer 100 performs the basic process when the computer 100 receives a print request from a specific application.

In S1 of main process, the CPU 11 acquires print data corresponding to the print request from the specific application. The print data is used for achieving color printing, and contains text data. The text data includes character data identifying characters, and color attribute data designating the color in which the characters should be printed based on the character data. The term "character data" used in conjunction with the present invention means any character contained in a character string. In the first embodiment, the term "character data" also includes a character code identifying a character.

In S2, the CPU 11 performs a print data conversion process for converting print data. The print data conversion process is performed to append new attribute data (settings data) to the character data contained in the print data, based on the color attribute data associated with the character data. In other words, the CPU 11 appends new attribute data to each text data included in the print data, based on the color attribute data included in the subject text data.

Next, the print data conversion process will be explained with reference to FIG. 5. In S11 of the print data conversion process, the CPU 11 extracts all sets of text data (character data and color attribute data associated with the character data) from the print data. In S12, the CPU 11 performs an ordinary character attribute data determining process. In this process, the CPU 11 determines the color attribute data most frequently used than any other color attribute data, as an ordinary character attribute.

Figures 6, 7:
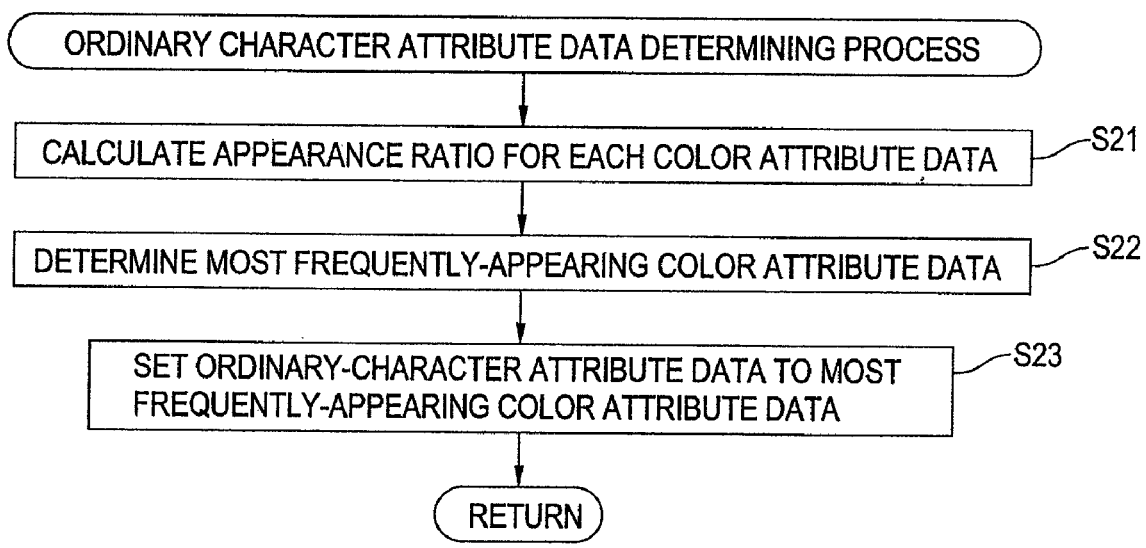
FIG. 6 is a flowchart illustrating steps in an ordinary character attribute data determining process in the print data conversion process.
FIG. 7 is a diagram showing a data structure of index table.

As shown in FIG. 6, the CPU 11 calculates an appearance ratio for each color attribute data in print data in S21. Specifically, the CPU 11 reads and scans the text data contained in the print data one after another, and counts, for each color attribute data, the number of color attribute data included in the text data. In other words, the CPU 11 scans the character data and the color attribute data, and counts the number of color attribute data that is associated with the character data in the print data. At this point, the CPU 11 refers an index table as shown in FIG. 7.

FIG. 7 shows an exemplary data structure of the index table. When the CPU 11 detects new color attribute data while reading the text data (that is, color attribute data not described in the index table may be detected), the CPU 11 adds color attribute data to left column in the index table shown in FIG. 7. The right column in FIG. 7 shows appearance ratios representing the frequency at which the color attribute data has appeared in the print data. In the example of FIG. 7, the CPU 11 detects 60 sets of text data including character data associated with "red" attribute, 280 sets of text data including character data associated with "black" attribute, and 8 sets of text data including character data associated with "blue" attribute. The CPU 11 may set the color attribute data in accordance to RGB values.

Returning to FIG. 6, the CPU 11 advances to S22 when the CPU 11 in S21 have read all sets of text data contained in the print data and created the index table shown in FIG. 7.

In S22, the CPU 11 determines the color attribute data that appears most frequently with referring to the index table. If the index table has the content shown in FIG. 7, the CPU 11 determines the "black" attribute as the color attribute data that appears most frequently (thereafter, will be referred as "most frequently-appearing color attribute data").

In S23, the CPU 11 sets the ordinary-character attribute data to the most frequently-appearing color attribute data determined in S22. If the CPU 11 performs monochrome printing with black, the CPU 11 sets and adds settings data (new attribute data) "black 100%" to the ordinary-character attribute. In some cases, the settings data (new attribute data) set in S23 may be identical to the attribute data already associated with the character data included in the text data. Thereafter, the CPU 11 ends the ordinary-character attribute data determining process and returns to the print data conversion process shown in FIG. 5.

In S13, the CPU 11 performs a non-ordinary character attribute data determining process. In this process, the CPU 11 sets, for each color attribute data, a prescribed attribute data to color attribute data of the text characters except for the most frequently-appearing character attribute data to which the ordinary-character attribute data is set.

Figures 8, 9, 10:
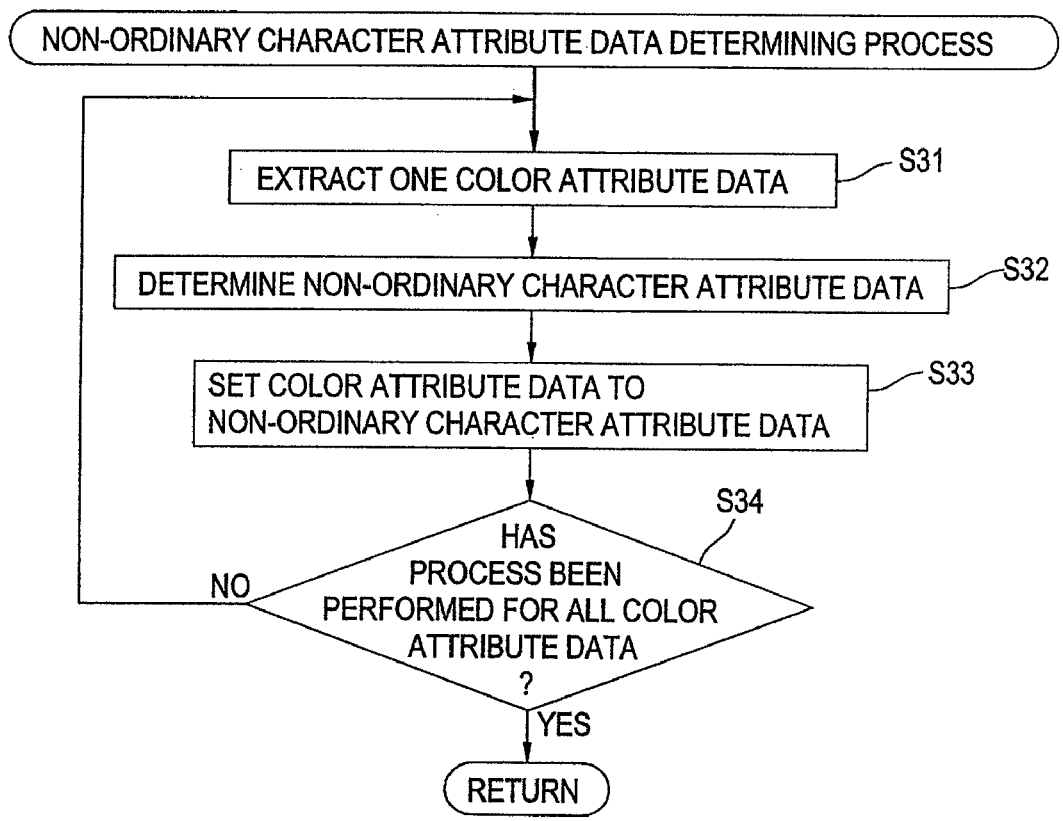
FIG. 8 is a flowchart illustrating steps in a non-ordinary character attribute data determining process in the print data conversion process.
FIG. 9 is a diagram showing a data structure of character attribute data table.
FIG. 10 is a diagram showing a data structure of character attribute content table.

The non-ordinary character attribute data determining process will be described with reference to FIGS. 8 and 9. As shown in FIG. 8, the CPU 11 extracts one color attribute data from among a plurality of sets of the color attribute data acquired from a plurality of sets of text data contained in the print data except for the ordinary character attribute data (S31). At this point, the CPU 11 refers to the index table shown in FIG. 7 and recognizes that which color attribute data is data to be set non-ordinary character attribute. In the example shown in FIG. 7, the CPU 11 determines color attribute data "red" and color attribute data "blue" as the color attribute data to be set the non-ordinary character attribute.

In S32, the CPU 11 determines each set of non-ordinary character attribute in associated with each set of color attribute data. In the first embodiment, the CPU 11 sets one of "emphasized character attribute" and "suppressed character attribute" to each set of color attribute data as the non-ordinary character attribute. The types of non-ordinary character attribute and the number thereof can be set appropriately. A character printed based on the character data that is set the emphasized character attribute is more conspicuous than a character printed based on the character data that is set the ordinary character attribute. Conversely, a character printed based on the character data that is set the suppressed character attribute data is less conspicuous than a character printed based on the character data that is set the ordinary character attribute. Next, five methods for determining the non-ordinary character attribute will be described in detail.

(Method 1: Method Using Color Difference)

If the color difference between color attribute data having the ordinary character attribute data (most frequently-appearing color attribute data) and the color attribute data to be processed is equal to or larger than a prescribed value, the CPU 11 sets "emphasized character attribute" to the color attribute data to be processed. However, if the color difference between the most frequently-appearing color attribute data and the color attribute data to be processed is smaller than the prescribed value, the CPU 11 sets "suppressed character attribute" to the color attribute data to be processed. The prescribed color value used here can be any appropriate value.

(Method 2: Method of Using Luminance Value)

If a luminance difference between a luminance value of the most frequently-appearing color attribute data and a luminance value of the color attribute data to be processed is equal to or larger than a prescribed value, the CPU 11 sets "emphasized character attribute" to the color attribute data to be processed. However, if the luminance difference between the luminance value of the most frequently-appearing color attribute data and the luminance value of the color attribute data to be processed is smaller than the prescribed value, the CPU 11 sets "suppressed character attribute" to the color attribute data to be processed. The prescribed luminance value used here can be any appropriate value.

(Method 3: Method Using Color Attractiveness)

If the color attribute data to be processed represents a warm color, the CPU 11 sets "emphasized character attribute" to the color attribute data to be processed. However, if the color attribute data to be processed represents a cold color, the CPU sets "suppressed character attribute" to the color attribute data to be processed.

(Method 4: Method of Using Complementary or Similar Color)

If the color attribute data to be, processed represents a complementary color to the color represented by the most frequently-appearing color attribute data, the CPU 11 sets "emphasized character attribute" to the color attribute data to be processed. However, if the color attribute data to be processed represents a color similar to the color represented by the most frequently-appearing color attribute data, the CPU 11 sets "suppressed character attribute" to the color attribute data to be processed.

(Method 5: Method of Using User Input)

The user may directly input the color attribute data to be set with the emphasized character attribute and the color attribute data to be set the suppressed character attribute data. In accordance with the user input, the CPU 11 sets one of "emphasized character attribute" and "suppressed character attribute" to the color attribute data to be processed. Note that the user can input the color attribute data in any method desirable.

Methods 1 to 5 described above may be used in any possible combination to set "emphasized character attribute" or "suppressed character attribute" to the color attribute data to be processed.

Returning to FIG. 8, the CPU 11 sets in S33 the non-ordinary character attribute determined in S32 to the color attribute data to be processed, and stores a result of determining into a character attribute table shown in FIG. 9. FIG. 9 shows an example of data structure of a character attribute table. This character attribute table also stores the result of determining the ordinary character attribute data (in S23 shown in FIG. 6) (i.e., which color attribute data has been set with the ordinary character attribute data). More precisely, the character attribute table stores three different character attributes, i.e., "ordinary attribute," "emphasis attribute" and "suppression attribute." In the "color attribute data" column, the non-ordinary character attribute imparted to the color attribute data to be processed is recorded. In the character attribute table of FIG. 9, "ordinary character attribute" is imparted to "black," "emphasis character attribute" to "red," and "suppression attribute" to "blue." The ordinary character attribute data determining process (S12) and the non-ordinary character attribute data determining process (S13) are processes of creating the character attribute table shown in FIG. 9.

Returning to FIG. 8, the CPU 11 determines whether the process has been performed on all sets of color attribute data to be processed in S34. If the process has not been performed on all sets of color attribute data (S34: NO), the CPU 11 returns to S31. If the process has been performed on all color attribute data to be processed (S34: YES), the CPU 11 terminates the non-ordinary character attribute data determining process and returns to the print data conversion process shown in FIG. 5.

Returning to FIG. 5, after the non-ordinary character attribute data determining process is completed (S13), the CPU 11 advances to S14. In S14, the CPU 11 scans the text data contained in the print data one after another, and appends the attribute determined in S12 or S13 to the text data (character data). In S14 the CPU 11 refers the character attribute table shown in FIG. 9 and an attribute content table shown in FIG. 10. FIG. 10 shows an example of data structure of an attribute content table. The attribute content table is stored in the RAM 13. In the attribute content table, three different character attributes include "ordinary character attribute," "emphasized character attribute" and "suppressed character attribute". They are same as those in the character attribute table. The "settings data" column indicates the specific content of the attribute data with which each character attribute is imported newly.

In the attribute content table of FIG. 10, "BOLD & overline and underline" is defined as "emphasized character attribute." The character to be printed based on the character data that is imparted with this attribute is more conspicuous than other characters, not appearing strange, and is not usually used in manuscripts.

In the attribute content table of FIG. 10, "down font size by 2 pt" is defined as "suppressed character attribute." This attribute can reduce the character size, for example, from "10 pt" to "8 pt." Alternatively, "suppressed character attribute" may be defined as "50% gray."

The character attribute table (FIG. 9) and the attribute content table (FIG. 10) can be combined into one table. Moreover, the user may rewrite the data in the attribute content table, at his or her discretion.

Returning to FIG. 5, the CPU 11 in S15 adjusts positions of the character to be printed based on the character data and new character attribute data (settings data). The new character attribute data set in S14 may influence the manuscript layout. For example, if the settings data indicates that the character size is reduced, the character to be printed will change in width. As a result, the positional character size will change in the line, and the number of characters constituting the line may change. If the settings data indicates that the character is changed to bold ones, they will change in width, possibly changing the number of characters constituting the line. This is why a process of adjusting the character, positions (e.g., kerning process) is performed so that the characters may assume the same layout as on the manuscript. Further, the CPU 11 in S15 may change the height of character for adjusting position of character to be printed.

Returning to FIG. 4, the CPU 11 in S3 generates binary data based on the print data converted through the print data conversion process of S2. In S4, the CPU 11 transmits the generated binary data to the printer 200. The printer 200 prints an image based on the binary data.

As described above, the printing system 1 according to the first embodiment can achieve monochrome printing of the characters, by adding appropriate attribute data (settings data) to the text data contained in the print data for color printing. Further, since the CPU 11 sets new attribute data (settings data) to the color attribute data, and then sets this new attribute data (settings data) to the text data, the CPU 11 scans the text data extracted from the print data only twice. Specifically, the CPU 11 scans the text data when the character attribute table is generated, and then when the new attribute is imparted to the characters. Therefore, it is possible to prevent increase of processes for setting the new attribute data to the print data for color printing.

As described above, in the first embodiment, the CPU 11 sets an ordinary character attribute to the color attribute data appearing at the highest frequently, in accordance with the appearance ratio of the color attribute data for the text data contained in the print data. In addition, the CPU 11 sets new character attribute data (settings data) to the other color attribute data except for the color attribute data to which the ordinary character attribute is set. Then, the CPU 11 converts, each set of text data, the print data based on new attribute data (settings data) corresponding to one of the ordinary character attribute data and the non-ordinary character attribute data. Accordingly, the CPU 11 can set an appropriate character attribute data for each text data, and can provide print data on which the printer 200 prints an easy-to-see monochrome image based.

Next, a printing system according to a second embodiment will be described with reference to FIGS. 11 to 14. In the second embodiment, the CPU 11 performs a main process shown in FIG. 12, instead of the main process shown in FIG. 4 according to the first embodiment. The printing system according to the second embodiment has the same construction as the first embodiment.

When the computer 100 receives print data including a plurality of sets of page data such as document pages from a specific application, the CPU 11 sets character attribute to the print data in accordance to one of the first and second methods. In the first method, the ordinary character attribute data and non-ordinary character attribute data are set to the text data in accordance with the color attribute data of the entire document (in accordance with a plurality of sets of color attribute data of the plurality of sets of page data contained in the print data. Thus, according to the first method, the CPU 11 creates one character attribute table for the entire document, and sets the character attribute data to the text data with reference to the common character attribute table. However, in the second method, the ordinary character attribute data and the non-ordinary character attribute data are set, for each set of page data, in accordance with the color attribute data of the subject set of page data. In other words, the CPU 11 creates, for each set of page data, each character attribute table and sets each character attribute data to the text data. The first and second methods achieve different monochrome printing results.

At this point, the text data converted according to the first method have more unity than that according to the second method. However, the first method needs a longer time for printing the first page of document than the second method.

Figure 11:
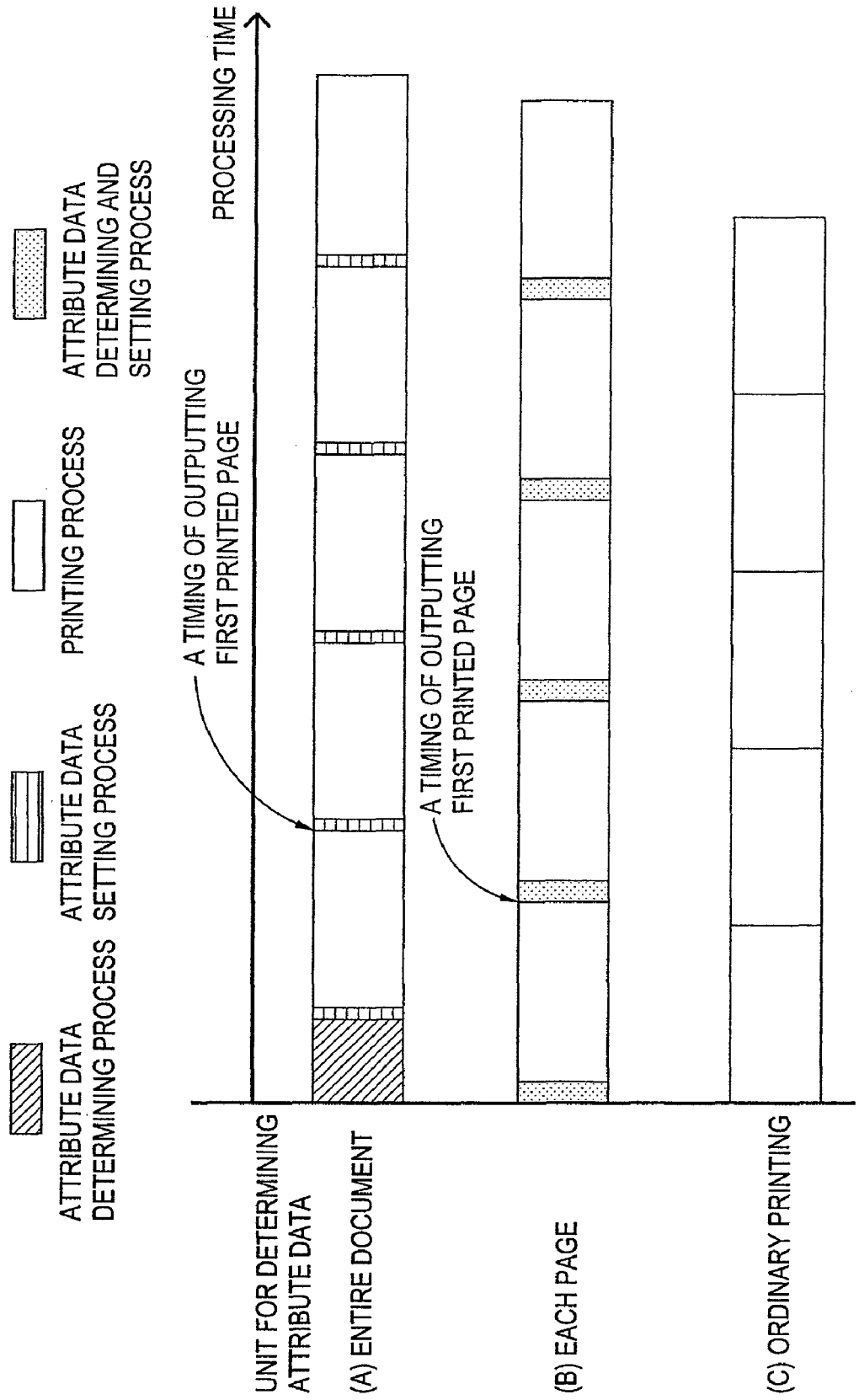
FIG. 11 is an explanatory diagram showing relation between processing times and a unit for determining attribute data.

The reason for difference between the first method and the second method will be explained with reference to FIG. 11. FIG. 11 shows the process time required to determine the character attribute based on the text data of the entire document (the first method, part (A)), the process time required to determine the character attribute from the text character data for each set of page data (the second method, part (B)), and the process time required to perform the ordinary printing (part (C)).

As shown in FIG. 11, according to the first method, processing time (hatched region) is spent to scan a plurality of sets of character data in the entire document and then to determine the character attribute based on the result of the scanning. Consequently, the timing of outputting the first printed page more delays than in the case where the character attribute is determined page by page. That is, the timing of outputting the first printed page is a time when the CPU 11 scans all sets of character data included in the entire print data and determines the character attribute based on the result of the scanning.

In view described above, the CPU 11 according to the second embodiment switches between a fast conversion process and a non-fast conversion process in accordance with whether a request has been made for fast printing. The request may be contained in the print data transmitted from the specific application. Further, the CPU 11 may prompt the user to input the request when the CPU 11 acquires the print data from the specific application.

Figure 12:
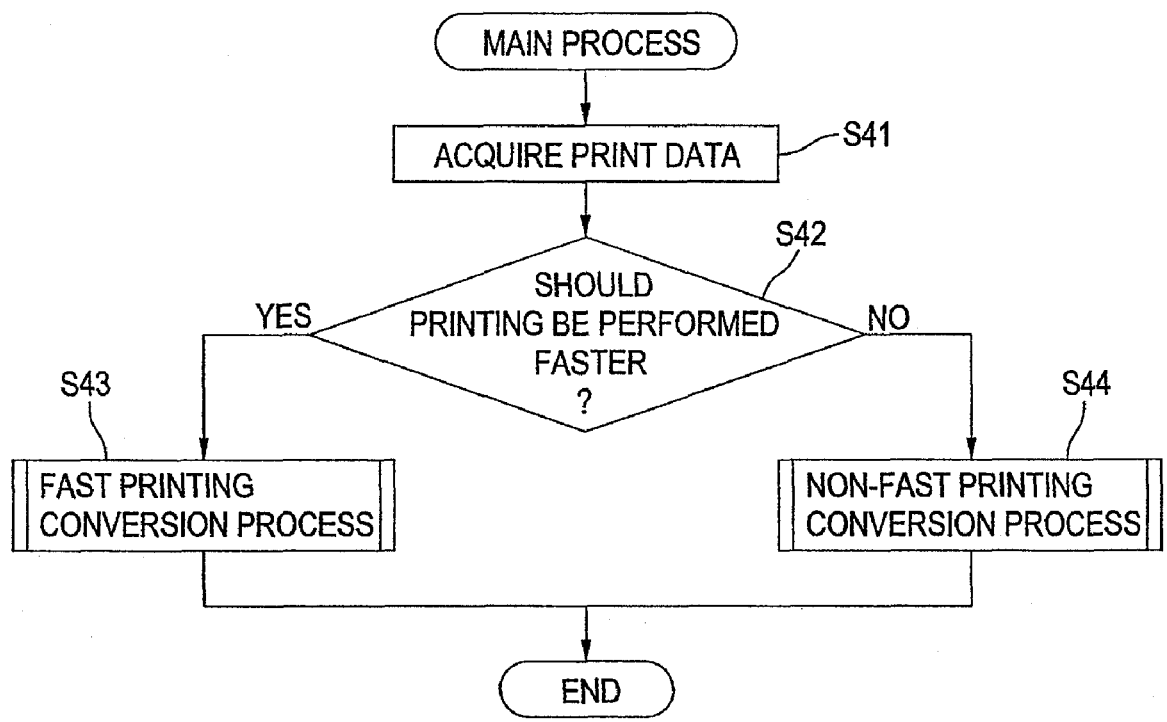
FIG. 12 is a flowchart illustrating steps in a main process according to a second embodiment.

The main process according to the second embodiment will be explained with reference to FIG. 12. The process of S41 is identical to the process of S1 (FIG. 4), and will not be described. In S42, the CPU 11 determines whether the printing for print data acquired in S1 should be performed fast. This determination is made depending on whether the computer 11 has received a request for faster printing.

If the CPU 11 determines that the printing should be performed faster (S42: YES), the CPU 11 advances to S43. In S43, the CPU 11 performs a fast conversion process. The fast conversion process will be explained later in detail.

If the CPU 11 determines that the printing should not be performed fast (S42: NO), the CPU 11 advances to S44. In S44, the CPU 11 performs a non-fast conversion process. The non-fast conversion process will be explained later in detail.

Figure 13:
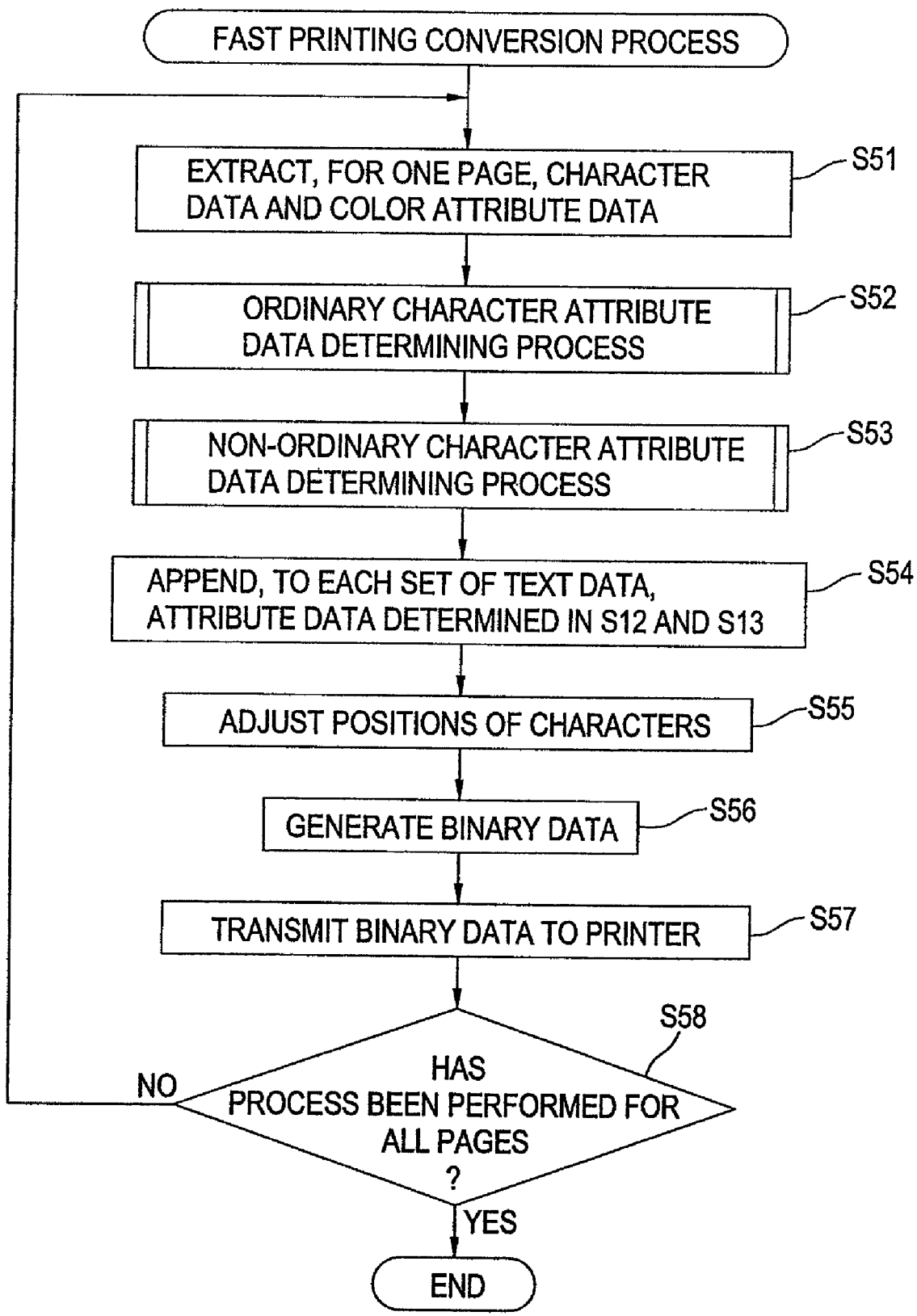
FIG. 13 is a flowchart illustrating steps in a fast conversion process in the main process according to the second embodiment.

The fast conversion process will be described with reference to FIG. 13. In S51, the CPU 11 extracts the text data contained in print data for one page. Specifically, the CPU 11 extracts, for one page, the character data and the color attribute data associated with the character data from the print data. The processes of S52 to S55 are identical to the processes of S12 to S15 (FIG. 5), respectively. Also, the processes of S56 and 57 are identical to the processes of S3 and S4 (FIG. 4), respectively.

In S58, the CPU 11 determines whether all sets of page data in the print data have been processed. If all sets of page data have not been processed (S58: NO), the CPU 11 returns to S15. However, the CPU 11 determines that all sets of all page data have been processed (S58: YES), the CPU 11 terminates the fast conversion process.

In the fast conversion process, the CPU 11 determines that the character attribute data for the text data contained in the print data, page by page, and creates a character attribute table for each set of page data. Therefore, the first printed page can be output faster than in the case where the character attribute data is determined for the entire document (see FIG. 11).

Figure 14:
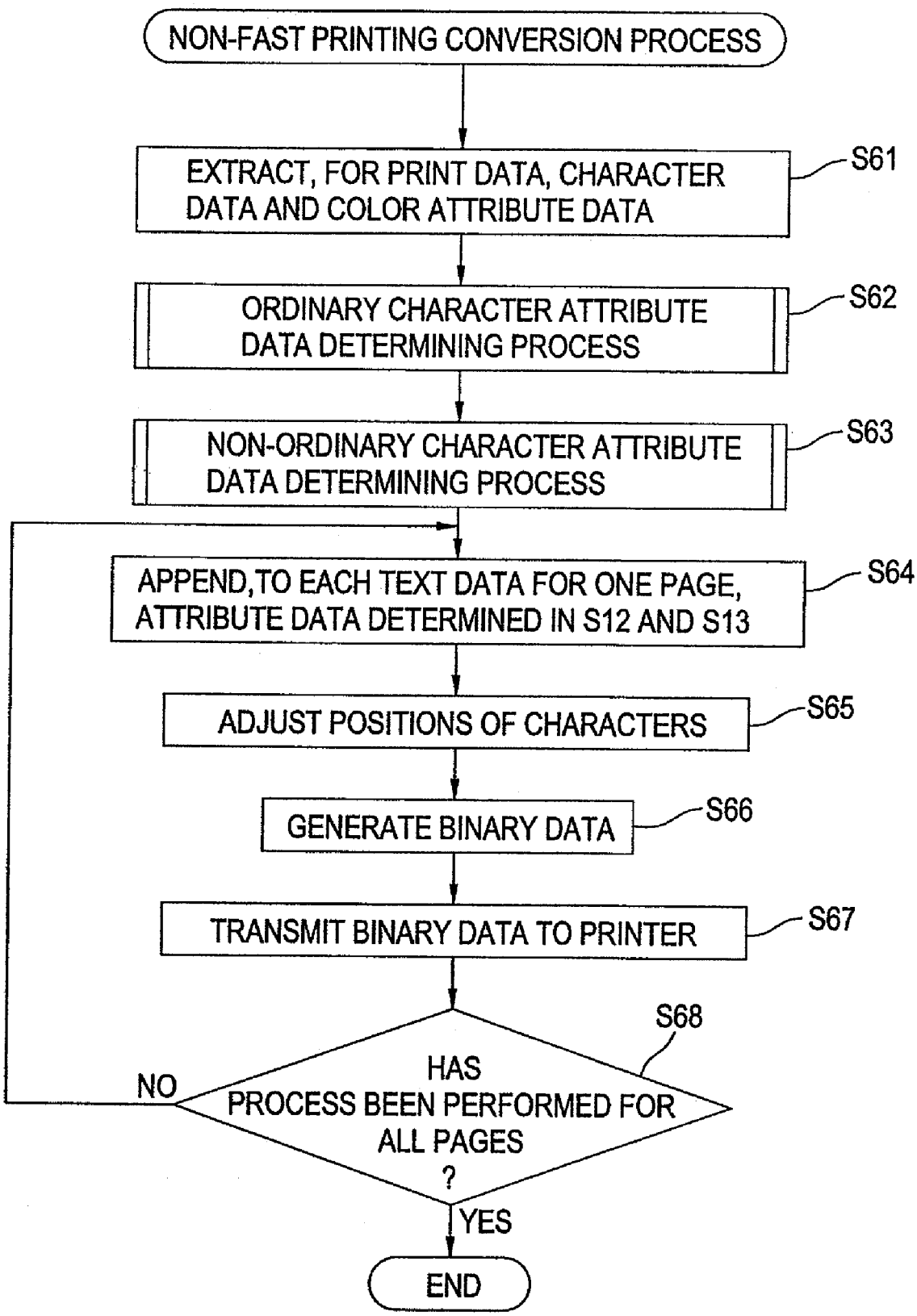
FIG. 14 is a flowchart illustrating steps in a non-fast conversion process in the main process according to the second embodiment.

The non-fast printing process will be explained with reference to FIG. 14. In S61, the CPU 11 determines that a plurality of sets of text data contained in the print data for all pages. Specifically, the CPU 11 determines that a plurality of sets of color attribute data associated with these text characters for all sets of page data.

Processes of S62, S63 and S65 are identical to the processes of S12, S13 and S15 (FIG. 5), respectively. The character attribute table created in S62 and S63 is based on the appearance ratio at which there appear the color attribute data for the text data contained in the print data for the all pages. Processes of S66 and S67 are identical to the processes of S3 and S4 (FIG. 4), respectively.

In S64, new attribute data (settings data) is imparted to the text characters contained in the print data for one page. The character attribute table used in S64 is common to all sets of page data. In S68, the CPU 11 determines whether the print data for all pages has been processed. If all pages are has not been processed (S68: NO), the process returns to S64. On the other hand, if all pages are found processed (S68: YES), the CPU 11 ends the non-fast printing process. Thus, the CPU 11 appends the new character attribute data to the text data, by using the character attribute table common to the entire document. Therefore, it is possible to attain a monochrome document at unity.

In the second embodiment, the CPU 11 determines whether the CPU 11 has received a request for fast printing. If a request for fast printing has been received, the CPU 11 creates a character attribute table for each set of page data. If the signal about a request for fast printing has not been received, the CPU 11 creates a common character attribute table that is common to the entire document (entire print data). Hence, the fast printing process is performed for a user who put importance on fast printing, and the non-fast printing process is performed for a user who does not regard the printing speed as important, proving a printed document at unity of character attribute.

In the second embodiment described above, the CPU 11 determines whether a character attribute table should be created for each set of page data or for the entire document (print data) in accordance with the user's input whether the user considers the printing speed important. In other words, the user needs to perform input operation.

In a third embodiment, the CPU 11 automatically switches between the fast conversion process and the non-fast conversion process. Specifically, the CPU 11 determines whether the character attribute data for the first page is identical to that for the second page. If the sets of character attribute data are identical to each other, the CPU 11 creates a character attribute table for the entire document. If the sets of character attribute data are not identical to each other, the CPU 11 creates character attribute tables for the respective set of page data. In the third embodiment, the sets of page data corresponding to the first page and second page are used for determining, but the first page and the third page or any other two pages may be used.

Figure 15:
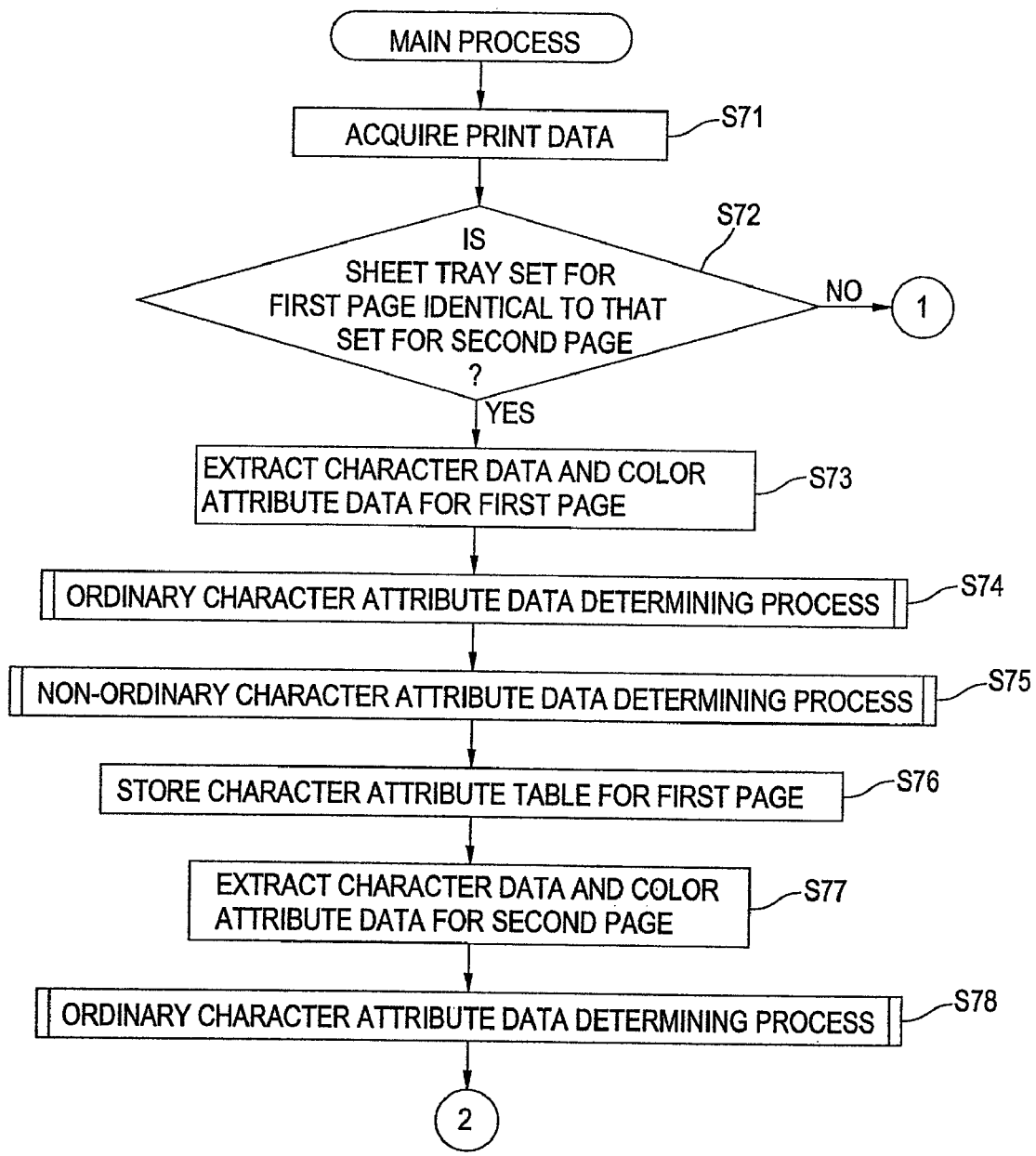
FIGS. 15 and 16 are flowcharts illustrating steps in a main process according to a third embodiment.
Figure 16:
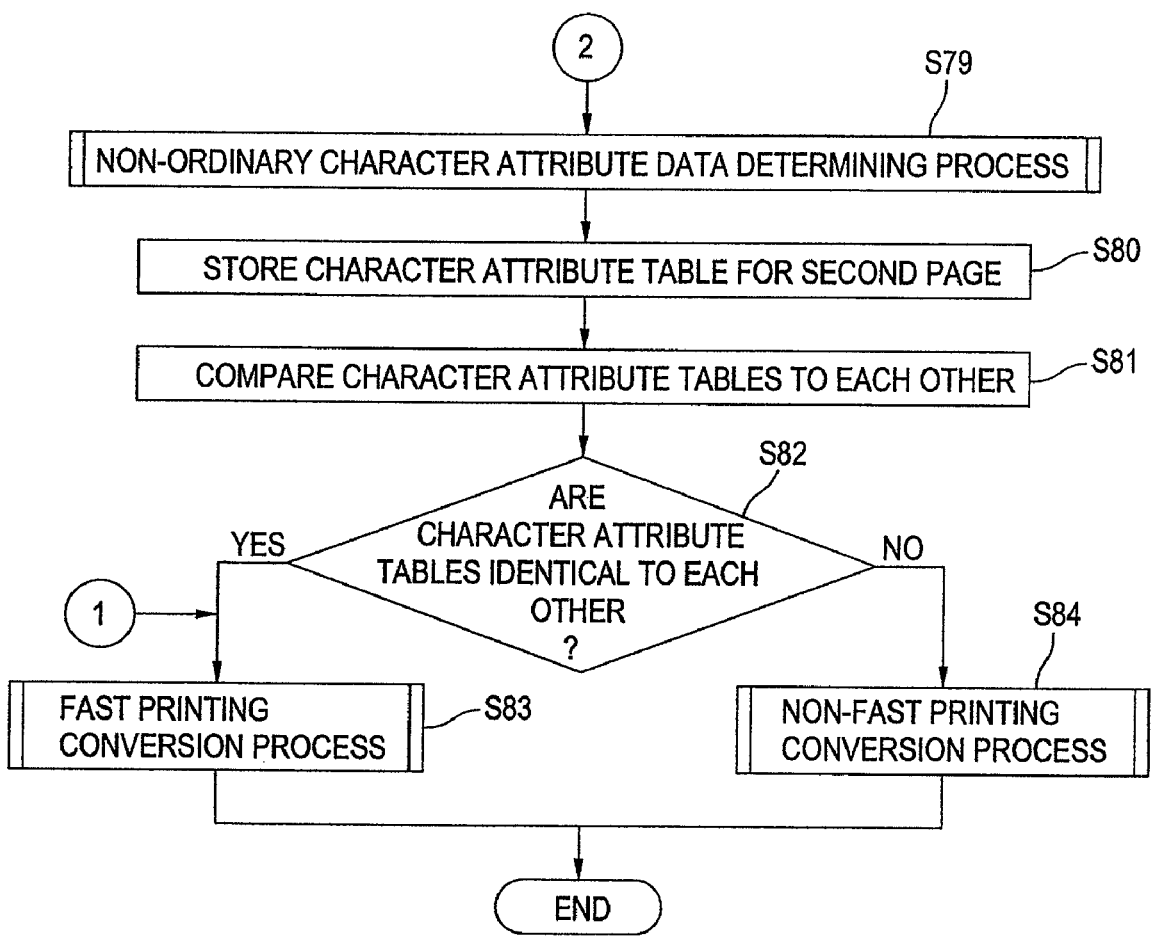

Next, main process according to the third embodiment will be explained with reference to FIGS. 15 and 16. A process of S71 is identical to the processes of S1 (FIG. 4). In S72 the CPU 11 determines whether the sheet trays set the first page and the second page are identical or different. If the CPU 11 determines that the sheet trays are different (S72: NO), the CPU 11 advances to S83. If the CPU 11 determines that the sheet trays are identical to each other (S72: YES), the CPU 11 advances to S73.

In S73, the CPU 11 extracts all sets of the text data contained the first page data. In S74 and S75, the CPU 11 performs, for the first page data, the ordinary character attribute data determining process shown in FIG. 6 and non-ordinary character attribute data determining process shown in FIG. 8. In S76, the CPU 11 stores, into the RAM 13, the contents of the character attribute table created in S74 and S75 (i.e., the character attribute table for the first page).

Processes of S77 through S80 are identical to the process S73 through S76, except that these processes of S77 through S80 are performed for second page data instead of the first page data.

In S81, the CPU 11 compares the character attribute table for the first page created in S76 to that for the second page created in S80. In S82, the CPU 11 determines whether the two character attribute tables are identical in content. If these character attribute tables are identical to each other (S82: YES), the CPU 11 performs the fast conversion process of S83. The fast conversion process is identical to that performed in the second embodiment (see FIG. 13).

On the other hand, if the characters attribute tables are not identical to each other (S82: NO), the CPU 11 performs the non-fast conversion process of S83. The non-fast conversion process is identical to that performed in the second embodiment (see FIG. 14).

In the third embodiment described above, the CPU 11 determines the sets of character attribute data for the pre-designated pages (e.g., the first and second pages). If the sets of character attribute data are identical to each other, the color usages in the pages of the document are identical. Here, the "color usage" in each page means the relation between the color of ordinary characters and the color of the emphasized or suppressed characters in each set of page data. In this case, the CPU 11 creates a character attribute table that is common to all pages of the document. If the character attributes is not identical to each other, the CPU 11 creates character attribute tables for the sets of page data. Thus, the CPU 11 can automatically switches between the fast conversion process and the non-fast conversion process without inputting the data designating the type of print data by the user. In addition, if the sheet tray storing a sheet to be printed the first page data is different from that to be printed the second page data, the CPU 11 automatically performs the fast conversion process, and appends each character attribute data to each set of page data in the print data.

In the second embodiment described above, when the print data need not be printed fast, the CPU 11 determines the character attribute data for the print data in accordance with the appearance ratio at which there appear the color attribute data in the print data for the entire print data. However, if the print data is a document in which the color usage differs from page to page (e.g., a document for presentation and a document usually consisting of a plurality of pages written by a plurality of persons), the character attribute data should better be determined page by page, for regardless of that the print data is printed fast or not.

Hence, in the fourth embodiment, the CPU 11 determines whether character attribute tables are created for the pages even if the print data need to be printed fast. More specifically, if the CPU 11 determines that the character attribute data for the first page data and that for second page data are identical to each other, the CPU 11 determines a common color usage is used for the entire document, and creates the common character attribute table for the entire document. However, if the CPU 11 determines the character attribute data for the first page data and that for second page are not identical to each other, the CPU 11 creates character attribute tables for the each page data. The two pages used to make this decision may be the first page and the third page, or any other two pages.

Figure 17:
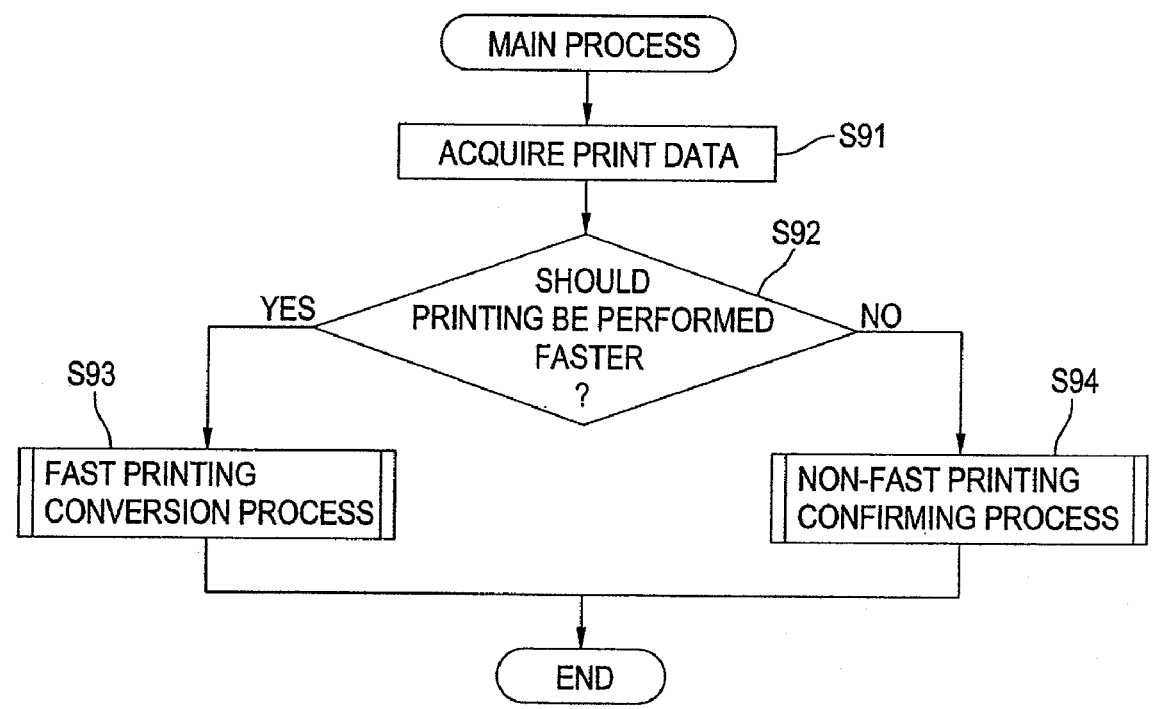
FIG. 17 is a flowchart illustrating steps in a main process according to a forth embodiment.

A main process according to the fourth embodiment will be explained with reference to the flowchart of FIG. 17. The processes of S91-S93 are identical to the processes of S41-S43 (FIG. 12), respectively, and will not be described. If the printing should not be performed fast (S92: NO), the CPU 11 determines a non-fast printing confirming process in S94. The non-fast printing confirming process will be explained later in detail.

Figure 18:
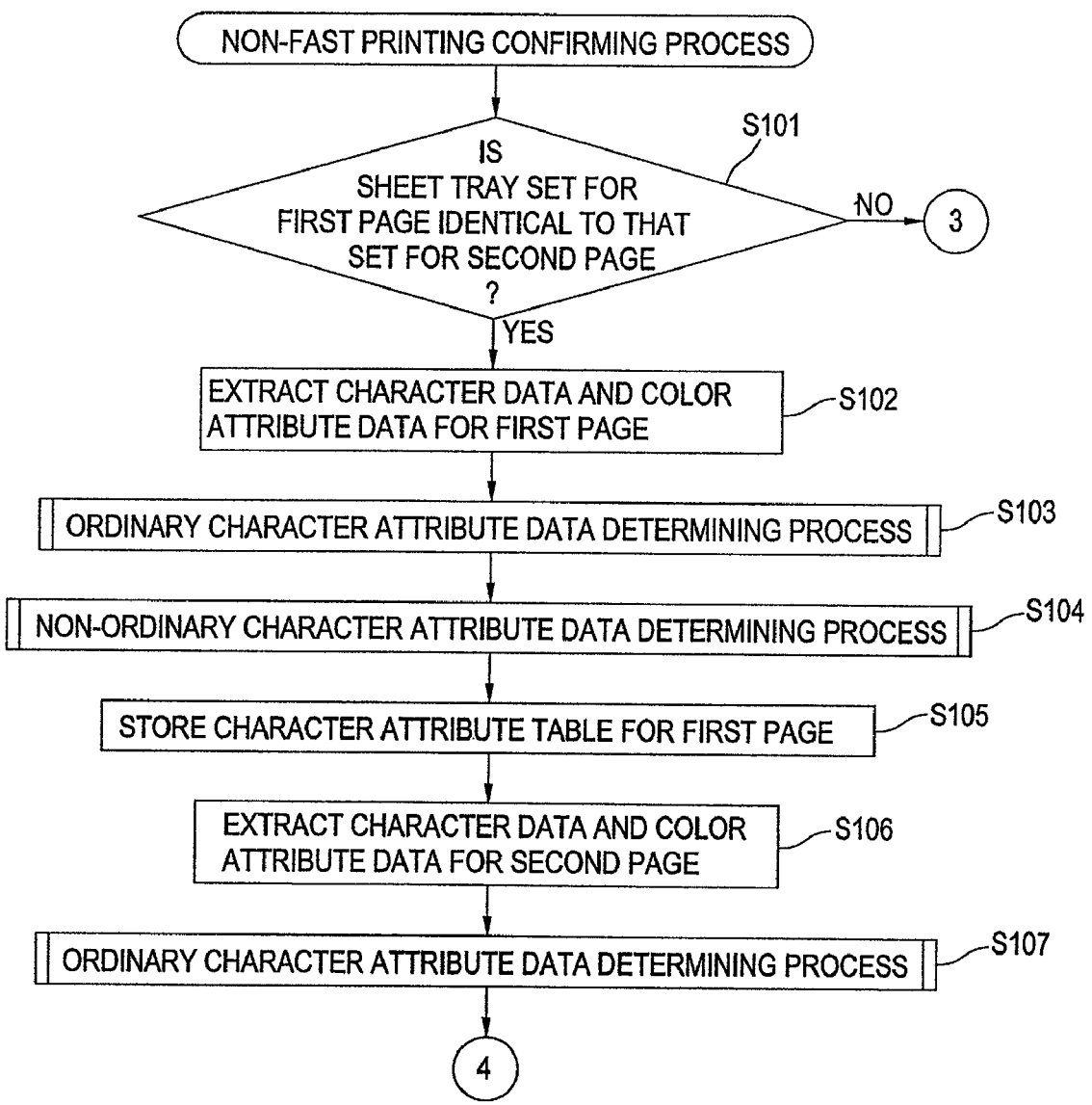
FIGS. 18 and 19 are flowcharts illustrating steps in a confirming process in the main process according to the fourth embodiment.
Figure 19:
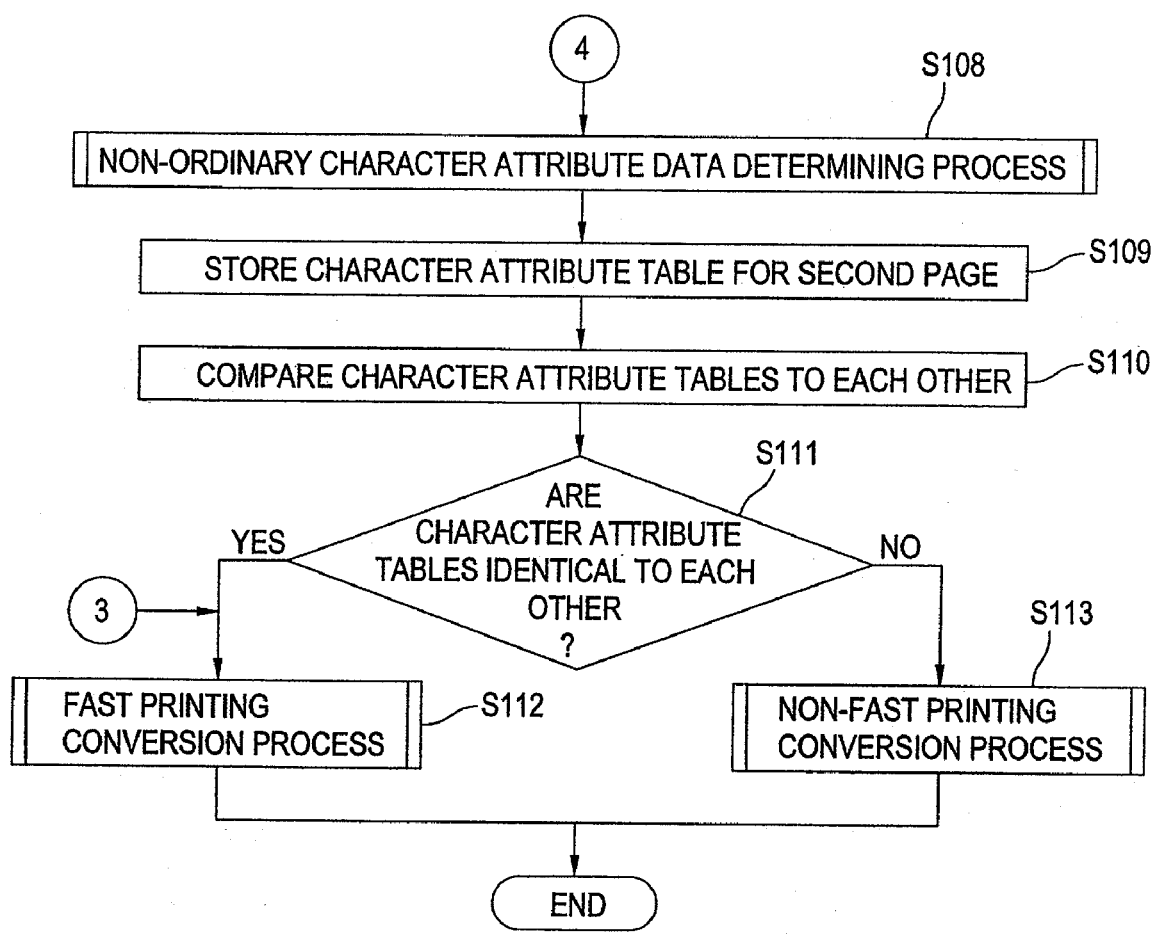

The non-fast printing confirming process will be described with reference to FIGS. 18 and 19. Processes of S101-S113 are identical to the processes of S72-S84 in the third embodiment (FIGS. 15 and 16), respectively.

In the fourth embodiment described above, if a request for fast printing is inputted, the CPU 11 determines character attribute data for each set of page data and appends new character attribute data (settings data) to the each set of page data. However, if the CPU 11 receives no requests for fast printing, the CPU 11 determines whether common character attribute data should better be appended to the entire document. If the common character attribute data should better be appended to the entire document, the CPU 11 creates a common character attribute table for the entire document. However, if the character attribute data should not be appended to the entire document, the CPU 11 performs the fast printing process even if the CPU 11 determines that the print data need not be printed fast. In the fast printing process, the CPU 11 performs a process in units of page as described above. Accordingly, the CPU 11 can perform the non-fast conversion process in units of documents, only if necessary. In other words, the CPU 11 can prevent to use common character attribute data for the entire document when the color usages differ from page to page.

While the invention has been described in detail with reference to the embodiments thereof, it would be apparent to those skilled in the art that various changes and modifications may be made therein without departing from the spirit of the invention.

For example, in the embodiments described above, the printer 200 prints the monochrome image with black toner, but the printer 200 may print a monochrome image with other color toner.

Further, a plurality of computers 100 may be provided in the image processing system. Also, a plurality of printer 200 may be provided in the image processing system.

The printer 200 may perform at least one part of the main process instead of the computer 100. That is, it may be used, as a computer, a printer having a processor that can execute specific programs and a storage unit storing various data temporarily and the others permanently. Further, the various processes described above may be performed in external apparatuses connected to the system by a network instead of the computer 100.

Further, a plurality of computers may achieve distributed processes, thereby to accomplish the embodiments. Alternatively, a processor and/or a memory may be used, both specially designed to reduce this embodiment to practice.

What is claimed is:

1. An image processing device comprising:
 an acquiring unit that acquires print data, the print data including a plurality of sets of text data, each set of text data having character data and color data;
 a calculating unit that calculates, for each set of color data, an appearance ratio at which a subject set of color data appears in the print data;
 a color data determining unit that determines the color data having a highest appearance ratio among a plurality of appearance ratios of a plurality of sets of color data as first color data, and determines the color data except for the first color data as second color data;
 an appending unit that appends first attribute data to the character data included in the text data having the first color data, and appends second attribute data to the character data included in the text data having the second color data; and
 a converting unit that converts a plurality of sets of character data into binary data, based on one of the first attribute data and the second attribute data which is appended to the subject set of character data.

2. The image processing device according to claim 1, further comprising a printing unit that prints characters based on the binary data.

3. The image processing device according to claim 1, wherein the print data includes a plurality of sets of page data, each set of page data having a plurality of sets of text data, each set of text data having character data and color data;
wherein the image processing device further comprises a setting unit that sets the image processing device to one of a first mode and a second mode,
wherein the calculating unit calculates, for each set of page data, each appearance ratio at which each set of color data appears in the subject set of page data when the setting unit sets the image processing device to the first mode, and calculates, for the print data, each appearance ratio at which each set of color data appears in the print data when the setting unit sets the image processing device to the second mode,
wherein the color data determining unit determines, for each set of page data, the first color data and second color data when the setting unit sets the image processing device to the first mode, and determines, for the print data, the first color data and second color data when the setting unit sets the image processing device to the second mode;
wherein the appending unit appends, to each set of character data, one of the first attribute data and the second attribute data that are determined for each set of page data when the setting unit sets the image processing device to the first mode, and appends, to each set of character data, one of the first attribute data and the second attribute data that are determined for the print data when the setting unit sets the image processing device to the second mode; and
wherein the converting unit converts, for each set of page data, the plurality of sets of character data into the binary data based on one of the first attribute data and the second attribute data which is appended to the subject set of character data when the setting unit sets the image processing device to the first mode, and converts, for the print data, the plurality of sets of character data into the binary data based on one of the first attribute data and the second attribute data which is appended to the subject set of character data when the setting unit sets the image processing device to the second mode.

4. The image processing device according to claim 3, further comprising a request determining unit that determines whether the print data includes request data representing that the print data should be printed; and
wherein the setting unit sets the image processing device to the first mode when the request determining unit determines that the print data includes the request data, and sets the image processing device to the second mode when the request determining unit determines that the print data does not include the request data.

5. The image processing device according to claim 3, wherein the print data includes first page data and second page data, the first page data having first text data, the first text data having first page character data and first page color data, the second page data having second text data, the second text data having second page character data and second page color data;
wherein the image processing unit further comprises:
a first calculating unit that calculates, for each set of first page color data, an appearance ratio at which the subject set of first page color data appears in the first page data;
a first page color data determining unit that determines the first page color data having the highest appearance ratio as first color data for first page, and determines the first page color data except for the first color data for first page as second color data for first page;
a second calculating unit that calculates, for each set of second page color data, an appearance ratio at which the subject set of second page color data appears in the second page data;
a second page color data determining unit that determines the second page color data having the highest appearance ratio as first color data for second page, and determines the second page color data except for the first color data for second page as second color data for second page; and
a page data determining unit that determines whether the first color data for first page is identical to the first color data for second page, and determines whether the second color data for first page is identical to the second color data for second page; and
wherein the setting unit sets the image processing device to the first mode when the page data determining unit determines that the first color data for first page is identical to the first color data for second page, and sets the image processing device to the second mode when the page data determining unit determines that the first color data for first page is different from the first color data for second page.

6. The image processing device according to claim 5, wherein the setting unit sets the image processing device to the first mode when the page data determining unit determines that the first color data for first page is identical to the first color data for second page and that the second color data for first page is identical to the second color data for second page, and sets the image processing device to the second mode when the page determining unit determines at least one of that the first color data for first page is different from the first color data for second page and that the second color data for first page is different from the second color data for second page.

7. The image processing device according to claim 1, wherein the converting unit converts the print data into the binary data so that a character to be printed based on the text data appended the first attribute data has a standard character style.

8. The image processing device according to claim 7, wherein the converting unit converts the print data into the binary data so that a character to be printed based on the text data appended the second attribute data has a character style which changes width size of the character from the standard character style.

9. The image processing device according to claim 8, further comprising an adjusting unit that adjusts a position of the character to be printed based on the text data appended the second attribute data.

10. The image processing device according to claim 7, wherein the converting unit converts the print data into the binary data so that a character to be printed based on the text data appended the second attribute data has a character style which adds at least one of underline and overline to the character.

11. An image processing method comprising:
acquiring print data, the print data including a plurality of sets of text data, each set of text data having character data and color data;
calculating, for each set of color data, an appearance ratio at which a subject set of color data appears in the print data;
determining the color data having a highest appearance ratio among a plurality of appearance ratios of a plurality of sets of color data as first color data;
determining the color data except for the first color data as second color data;
appending first attribute data to the character data included in the text data having the first color data;
appending second attribute data to the character data included in the text data having the second color data; and
converting a plurality of sets of character data into binary data, based on one of the first attribute data and the second attribute data which is appended to the subject set of character data.

12. A non-transitory, computer-readable recording medium that stores an image data processing program, the data processing program comprising instructions for:
acquiring print data, the print data including a plurality of sets of text data, each set of text data having character data and color data;
calculating, for each set of color data, an appearance ratio at which a subject set of color data appears in the print data;
determining the color data having a highest appearance ratio among a plurality of appearance ratios of a plurality of sets of color data as first color data;
determining the color data except for the first color data as second color data;
appending first attribute data to the character data included in the text data having the first color data;
appending second attribute data to the character data included in the text data having the second color data; and
converting a plurality of sets of character data into binary data, based on one of the first attribute data and the second attribute data which is appended to the subject set of character data.

13. An image processing system comprising:
a printing device that prints characters based on binary data; and
an image processing device, the image processing device comprising:
an acquiring unit that acquires print data, the print data including a plurality of sets of text data, each set of text data having character data and color data;
a calculating unit that calculates, for each set of color data, an appearance ratio at which a subject set of color data appears in the print data;
a color data determining unit that determines the color data having a highest appearance ratio among a plurality of appearance ratios of a plurality of sets of color data as first color data, and determines the color data except for the first color data as second color data;
an appending unit that appends first attribute data to the character data included in the text data having the first color data, and appends second attribute data to the character data included in the text data having the second color data; and
a converting unit that converts a plurality of sets of character data into the binary data, based on one of the first attribute data and the second attribute data which is appended to the subject set of character data;
a transmitting unit that transmits the binary data to the printing device.

* * * * *